July 27, 1965 E. L. ECKSTEIN 3,197,575

HIGH DENSITY RECORDER UTILIZING LOW TAPE SPEED

Filed Aug. 10, 1960

2 Sheets-Sheet 1

INVENTOR.
Emil L. Eckstein
BY
Lippincott, Ralls & Hendricson
Attorneys

HIGH DENSITY RECORDER UTILIZING LOW TAPE SPEED

Filed Aug. 10, 1960 2 Sheets-Sheet 2

INVENTOR.
Emil L. Eckstein
BY
Lippincott, Ralls & Hendricson
Attorneys

1

3,197,575
HIGH DENSITY RECORDER UTILIZING LOW TAPE SPEED
Emil L. Eckstein, 27002 Whitestone Road, Palos Verdes Peninsula, Calif.
Filed Aug. 10, 1960, Ser. No. 48,773
11 Claims. (Cl. 179—100.2)

The present invention relates to an improvement in recording and playback mechanism as may be employed in connection with magnetic tape, for example, and more particularly to high density recording at relatively slow tape speeds, wherein an improvement in quality and control are achieved.

In order to maximize the utility and applicability of tape recording and playback mechanisms, it is highly desirable to maximize the density of recording. The present invention is highly advantageous in accomplishing the foregoing, while at the same time providing for very high quality reproduction. Although a high recording rate is desirable, the high tape velocity is not, for the latter causes excessive tape wear, and furthermore, requires an overly large quantity of tape for any given recording. In the field of magnetic tape recorders there have been advanced various systems for increasing the density of recordings as, for example, by to-and-fro and zig-zag recording sequences. These above approaches, as well as the system of longitudinal tape reversals, suffer from numerous disadvantages, not the least of which is the extreme difficulty or impossibility of editing recordings There is provided by the present invention a unidirectional continuous longitudinal step recording, wherein a very high density of information is applied to the tape, and yet the limitations of the prior art are overcome. More speciffically, there is herein provided for multiple segmented track recording, wherein no interference between recorded segments is possible, and yet there are retained the desirable features of low density recording systems, such as the availability of editing. Also, the present invention provides for automatic "phasing" of tape and playback apparatus, so that no trial-and-error operations are necessary to achieve desired and, in fact necessary, physical relationship between the tape and heads. Included herein is automatic compensation for unavoidable mechanical variables encountered in tape recording, such as gear lash, parts tolerances, tape stretching, and the like. As a result of these provisions, the invention hereof provides for a very slow tape speed while yet accommodating a high rate of recording. This commends the system hereof to miniaturization which has proven quite advantageous in that a truly miniature recorder of some few inches in overall dimension records some hours of spoken or musical information.

It is therefore an object of the present invention to provide an improvement in tape recording, wherein multiple segmented longitudinal recording tracks are so employed as to achieve high density recording while preventing interference between segments.

It is another object of the present invention to improve and simplify high density tape recording and playback by the provision of automatic compensation for unavoidable variables, to guarantee high quality reproduction.

It is a further object of the present invention to provide in tape recording apparatus for high density recording with longitudinal segmented tracks, together with positive tape drive oriented with respect to recording and playback heads for automatic proper tape-head alinement.

Yet another object of the present invention is to provide tape recording apparatus having predetermined time gaps of the order of human hearing presistence between successively played and recorded segments of multiple track recording, for precluding the reproduction of interference signals.

2

Various other advantages and possible objects of the present invention will become apparent to those skilled in the art from the following description of particular preferred embodiments hereof; however, no limitations are intended by the terms of such description, and instead, reference is made to the appended claims for a precise delineation of the true scope of this invention.

The invention is illustrated in the accompanying drawings, wherein.

Figure 1:
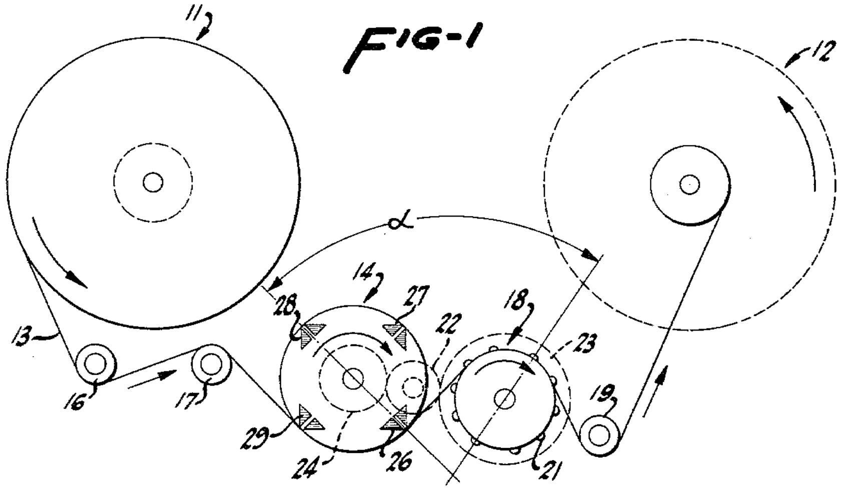
FIG. 1 is a plan view schematically illustrating the tape recording and playback mechanism of the present invention.
Figure 2:
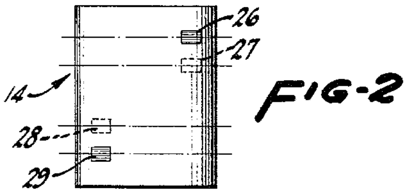
FIG. 2 is an enlarged elevational view of a recording or playback drum, as employed in a system of FIG. 1.
Figures 3, 4:
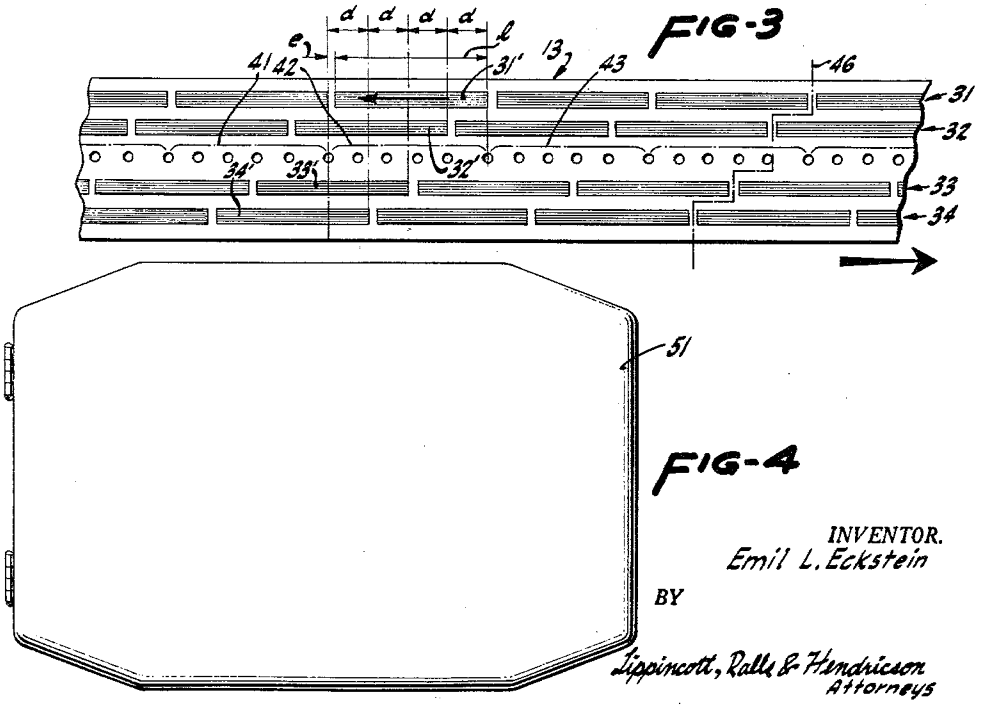
FIG. 3 is an enlarged view of a portion of magnetic tape, with longitudinally segmented multiple track recordings thereon, as produced by the present invention.
FIG. 4 is a full size plan view of a miniaturized tape recorder package.

Considering now the present invention in some detail, and referring to FIGS. 1–3, wherein there is illustrated one preferred embodiment of the invention together with a magnetic tape recording as may be produced by such embodiment. A pair of tape reels 11 and 12 are provided for the delivery and take-up of tape. In the following description, it will be assumed that the apparatus hereof is operating upon magnetic tape of the type generally employed in conventional recording operations, although it is to be appreciated that the invention hereof is applicable to other types of tape recording. The magnetic tape 13 is shown as being initially wound about the delivery reel 11 at the left of FIG. 1, and being taken up upon the take-up reel 12 at the right of FIG. 1. In traverse from the delivery to take-up reels, the magnetic tape 13 is constrained to pass over a predetermined circumferential portion of a recording or playback drum 14. Inasmuch as the recording operation, in accordance with this invention, is substantially identical to the playback operation, the illustrations are simplified by the showing of only recording means. Playback and erasing heads are omitted in the interests of clarity. The basic mechanism of magnetic tape recording, as is conventionally employed, is also utilized herein. Thus, there may be used a normal magnetic tape having a plastic backing with magnetic particles held in pre-oriented position thereon by a thin coating. Recording heads, for example, may include magnet windings having a minute gap through which the magnetic field extends for influencing the tape particles with intelligence signals as the tape moves thereover. Inasmuch as the gaps in conventional recording heads are quite small, as of the order of 0.00025 inch, or less, it is possible to record and reproduce human speech with a suitable frequency range at a tape speed of $1\frac{5}{16}$ inch per second.

In the system illustrated in FIG. 1, the magnetic tape is unwound from the reel 11, and passed about guide rolls 16 and 17 across a predetermined circumference of the magnetic recording drum 14. The tape is withdrawn from the delivery reel and moved across the drum 14 by a capstan 18, from whence the tape then travels about one or more further guide rolls 19 back onto the take-up reel 12. Positive tape drive is herein provided by circumferentially spaced sprockets 21 about the capstan 18, and adapted to engage perforations in the tape, as discussed in greater detail below. A driving interconnection is provided between the recording drum 14 and capstan 18 as, for example, by means of an intermediate gear 22 meshing with a gear 23 upon the capstan and a further gear 24 upon the recording drum. Alternatively, there may be employed worm or conical gears resiliently engaging the capstan and drum gears.

In accordance with the present invention, there are recorded a plurality of segmented tracks upon a tape passing over the drum 14, and these tracks are offset laterally of the tape. In the illustrated embodiment, some four tracks are to be produced upon the tape, and consequently, there are provided four recording heads 26, 27, 28 and 29 about the circumference of the drum 14. These recording heads are spaced equally about the circumference of the drum so as to be thereby separated by 90 degrees of the drum circumference, and furthermore, the heads are offset longitudinally of the drum, in the manner illustrated in FIG. 2, so as to thereby contact the magnetic tape 13 passing over the drum at different heights thereon.

Considering now the present invention in somewhat greater detail, with reference to the physical elements thereof as described above, reference is specifically made to FIG. 3 of the drawings. It is well known to be highly desirable to attain a very rapid recording rate, and with stationary recording heads this recording rate is then equal to the velocity of the tape past the stationary head. Improvements in recording rate may be attained by moving the head also, and this movement, as above noted, may be provided in a variety of directions relative to the tape itself. In the present invention the movement of recording heads is accomplished in the reverse direction of tape travel, so as to thereby record longitudinal tracks upon the tape, in distinction to alternative arrangements wherein transverse recordings are impressed upon the tape. It is herein contemplated that there shall be provided for the rotation of magnetic recording heads about an axis transversely to tape travel, so as to thereby move the heads along the tape in the direction opposite to the direction of tape travel. In the embodiment of the present invention illustrated in FIGS. 1 and 2, there are provided some four recording heads, as above noted, and these are offset longitudinally of the drum so as to be oriented in offset relation laterally across magnetic tape drawn across the drum. In the instance wherein the magnetic tape moves from left to right in FIG. 1 of the drawings, the drum 14 is rotated in a clockwise direction. Consequently, the rate of recording is materially increased, in that same is actually proportional to the relative velocity of recording head and tape. Although the foregoing may be arrived at relatively easily from a basic consideration of recording criteria, such does not alone provide an operable tape recorder. In accordance with the present invention, particular provisions are made for preventing difficulties and interferences from arising in this type of recording system.

In the present invention, the velocity of the tape and the peripheral drum speed are particularly determined to insure the presence of a physical gap between separate segments of each individual recording track. Thus, as shown in FIG. 3, there are provided some four separate recording tracks 31, 32, 33 and 34, with each of the tracks being divided into separate longitudinal segments which are displaced from each other longitudinally of the tape by a short distance therein identified as *e*. The individual segment length is indicated by the letter *l*, and with *n* number of heads on the drum 14, the present invention provides a relationship between tape speed $v_t$ and peripheral drum speed $v_h$ equal to $$\frac{v_t}{v_h}=\frac{1+\frac{e}{l}}{n-1-\frac{e}{l}}$$

Although the segment separation *e* is maintained quite minute, its presence is of extreme importance in preventing possible overlapping of separate recorded segments of a single track, for such overlapping would unavoidably produce interference signals whereby undesirable noise would be produced, and possibly intelligence lost. Actual recording operations provide for the movement of the tape to the right in FIG. 3 a distance *d* during the time that the first recording head 26 rotates one-quarter turn so as to thereby record a track segment 31' of length *l* upon the tape. During the time that the head 26 rotates the remaining three-quarter turn to complete one revolution and thereby again engage the tape, the tape advances to the right a distance $3d$. Between successive engagements of the head 26 with the tape to record successive segments of track 31 (e.g., segment 31' and the segment to the left thereof as viewed in FIGURE 3) the tape hence advances to the right a distance $4d$. Since there is to be a gap *e* between successive segments, the distance of tape movement between successive engagements of the tape by the same head must be equal to the segment length *l*, increased by the gap length *e*. Thus, $nd=l+e$, as shown in FIG. 3. The segment length is, of course, determined by the tape distance over which the head sweeps during one-quarter of a revolution thereof while the tape has simultaneously advanced the distance *d*. At the termination of recording of segment 31' by the first head 26, same moves past the point at which the tape engages the drum, and the second head 27 substantially simultaneously engages the tape at a position 90 degrees displaced about the drum. The second head 27 then records the segment 32' of FIG. 3, and it is to be appreciated in this respect that there is a substantial coincidence in time between the beginning of the track segment 32' and the termination of the track segment 31'. In like manner, the subsequent track segments 33' and 34' are recorded during one complete revolution of the drum 14. The physical gap *e* provided between the different segments of each track along the tape does not appear as a time delay or interval in the recording. To the contrary, these separations *e* provide for insuring against interference between separate segments of individual tracks.

In order for the invention hereof to satisfactorily perform high fidelity recording with multiple tracks, wherein each is longitudinally segmented in the manner described above, it is necessary for the relationship between tape velocity and peripheral head or drum velocity to be maintained within relatively close tolerances. Consequently, more conventional tape drive means are not preferred in this respect. There is herein provided for a positive tape drive by the sprockets 21 upon the capstan 18. As illustrated in FIG. 3, the magnetic tape 13 is provided with a series of perforations disposed longitudinally thereof as, for example, along the center line of the tape. These perforations are designed to be engaged by the sprockets of the capstan 18, so as to thereby positively move the tape without slipping. It is further to be noted that in the instance wherein a plurality of heads are employed in the manner of the present invention, difficulties readily arise in threading the tape into playback mechanism. This difficulty is herein precluded by the provision of a plurality of sets of perforations 41, 42, 43 along the tape, instead of a mere continuous succession of evenly spaced openings of the tape. As illustrated, these sets of perforations may be arranged to provide a like spacing between a number of successive openings and a substantially greater or lesser distance to another opening of the same set. The individual sets of perforations are repeated every tape length equal to the distance of tape travel for one complete drum revolution. The sprockets 21 upon the capstan 18 are disposed about such capstan in the same spacing arrangement as are the perforations upon the tape, so as to thereby mate therewith. It will thus be seen with this arrangement to be impossible to thread the tape upon a capstan in any manner except the exactly proper relationship to the heads upon the drum. With this type of longitudinal high density recording, it is of major importance to provide for properly phasing the tape and playback heads in order that intelligence may be obtained from the tape, for otherwise, the tape would be improperly positioned to have the individual longitudinal track segments thereof engaged by the appropriate playback head during traverse of the tape over the drum. Although it may be possible to overcome this problem in other more complicated manners, it will be seen that the present invention provides a simplified and highly desirable solution to the problem. As a production precaution to guarantee identical tape lengths between head drum and capstan of separate machines, a template or the like may be employed during manufacture to fix a like angle alpha between diameters through points such as head 26 and a sprocket displaced $4d$ tape length away for each machine, as shown in FIGURE 1.

The above-described embodiment of the present invention is particularly adapted to the provision of a truly miniature and high-quality tape recording and playback apparatus. Such apparatus may, for example, be wholly enclosed in a case 51 having a longitudinal dimension slightly less than 5 inches and a width less than 3½ inches. The total depth of such an apparatus may be maintained at about 1 inch. Because of the high density recording attained hereby, it is possible to utilize a very slow tape speed, and a highly acceptable audio recording apparatus of this size may be produced with a recording speed of $1\frac{5}{16}$ inch per second. With four heads, the tape speed would then be less than ¼ inch per second. Numerous advantages attach to this low tape speed; for example, it is then not necessary to exert a high pressure between the tape and recording heads in order to insure impression of recorded information upon the tape. This materially reduces the wear upon the tape itself, and consequently, constitutes a substantial advancement in the art. As a further consequence of the foregoing, is the extremely low power requirements for driving the recording mechanism, so that only minute batteries are necessary to power the equipment. Similarly, only relatively small tape reels are required, and thus as an example, a 2.4 inch diameter reel is adequate to hold sufficient tape for four hours of speech recording, wherein the magnetic tape has a thickness of 1 mil. The minimal tape tension will be seen to minimize stretching of the tape, so as to consequently limit this difficulty in quality reproduction; additionally, the tape transport provided by the sprocket and perforation engagement avoids tape slippage, and furthermore, the invention precludes deleterious influencing of the recording and playback by temperature changes.

A further portion of the present invention, which is most difficult to illustrate, lies in the provision herein of a slight time differential between the termination of one track segment and the beginning of the successive segment on the next track. It will be recognized that no mechanical device operates without certain mechanical tolerances which introduce unavoidable errors in drive mechanisms, and the like. It is by the recognition of such unavoidable circumstances, and the provision of suitable means for overcoming the disadvantages thereof, that the present invention provides the highly desirable results hereof. In this respect, the minute time difference between successive segments of adjacent tracks further provides for preventing playback of sound phase differences. More specifically, the foregoing relates to the possibly unpleasant sounds arising from the fact that sequential head engagement with the tape may not exactly coincide with the next recorded track segment. Thus, slight inaccuracies or unavoidable tolerances in manufacturing may result in individual playback heads engaging the tape slightly off of the exact beginning of the track segment which same is to play. This foregoing problem is overcome herein by allowing the human persistance in hearing to fade out to a sufficient extent that the human ear will not detect such slight imperfections. It is known that there is a persistence of hearing which has a magnitude of the order of 0.03 to 0.05 second, and thus, the present invention provides for at time delay of 0.01 to 0.07 second between the playing of track segments in successive tracks so as to provide for a period of tape silence or non-playback of the order of the persistance of hearing of the human ear. This is accomplished herein by controlling the duration of engagement of the recording head with the tape. This control may be best attained herein by passing the tape over somewhat less than the calculated circumferential distance about the recording drum. In the foregoing example, wherein some four recording heads were disposed about a single recording drum, the magnetic tape is thus limited to a traverse of somewhat less than 90 degrees of the drum, so that one recording head leaves the tape slightly before the next recording head engages the tape. It is particularly pointed out that this time gap discussed above is not the same gap, nor does it serve the same function as the segment separation $e$, discussed previously. The physical separation between separate segments of an individual recorded track serves to prevent interference or loss of information from overlapping of the track segments along a single track, and is, in fact, only a geometrical separation which does not appear as a time separation, or as a tape silence period during operation or playback of the tape. The time gap is herein accomplished by making the extent of contact about the head drum with the tape slightly less than 360 degrees divided by $n$, the number of heads upon the drum.

Figure 5:
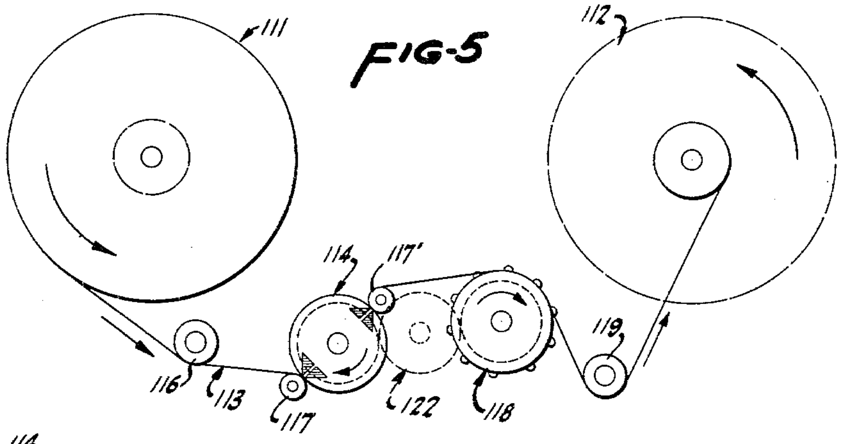
FIG. 5 is a plan view schematically illustrating an alternative tape recording or playback system, in accordance with the present invention and adapted for utilization with stereophonic sound.
Figure 6:
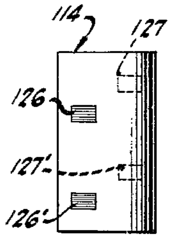
FIG. 6 is an enlarged elevational view of the playback or recording drum of the system of FIG. 5.
Figure 7:
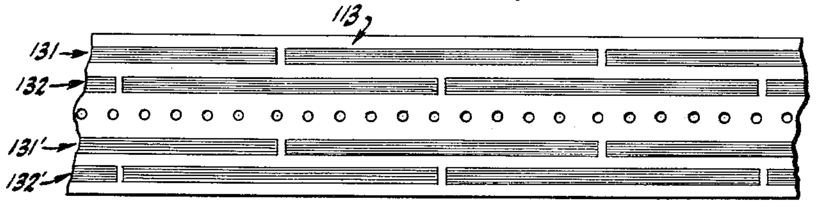
FIG. 7 is an enlarged view of magnetic tape having segmented recording thereon, as may be produced by the system of FIG. 5.

Although the present invention has been described above in connection with conventional audio reproduction, it will be appreciated that same is equally applicable to the recording and playback of musical information, or any other type of sound signals. In particular, the invention is applicable to stereophonic sound recording and playback. A simplified illustration of the present invention suitable for utilization in stereophonic sound recording is illustrated in FIGS. 5 and 6, and an expanded section of magnetic tape recorded in accordance with the present invention, as shown in the latter embodiment, is illustrated in FIG. 7. It will be seen in the embodiment of the present invention therein illustrated, that magnetic tape 113 is unwound from a delivery reel 111, and after passage over a guide roll 116 and thence about substantially 180 degrees of a recording drum 114. A pair of definition rolls 117 and 117′ guide the tape onto the drum to precisely define the beginning and ending points of each track element, and preferably these definition rolls are mounted for adjustment along the circumference of the head drum. In this embodiment, a sprocketed capstan 118 provides positive tape transport and the tape thence passes about a further guide roll 119 onto a take-up reel 112. Drive means between the capstan and head drum may include suitable gearing 122.

In the instance wherein it is desired to simultaneously record two tracks for stereophonic reproduction, the recording drum 114 may have recording heads 126, 126′ and 127, 127′ disposed thereon in alined pairs. Thus, as shown in FIG. 6, the two recording heads 126, 126′ may be disposed in vertical alinement upon the drum, and the other pair of recording heads 127, 127' may be disposed in alinement with each other and displaced some 180 degrees about the drum from the first pair. In this embodiment of the present invention, there is provided for simultaneous recording of dual tracks 131, 131' and 132, 132' on the magnetic tape, as indicated in FIG. 7.

Operation of the embodiment of the present invention illustrated in FIGS. 5 and 6, follows directly from the description of operation of the first-described embodiment of the invention. Although neither this nor the previously described embodiment is limited to miniaturized tape recorders, it is noted that the stereophonic recorder may operate, for example, at a recording speed of 2.44 inches per second, with the tape thickness of about 1 mil, so as to provide for one hour of high fidelity recording with a maximum reel diameter of 2.75 inches. With regard to the equalizing of power levels at the separate heads of the present invention in either of the illustrated embodiments, it is noted that power ratios in sounds up to 2 to 1 are not clearly noticeable by the human ear. Consequently, no particularly difficult problem is posed in sufficiently equalizing the power levels between the heads to provide a highly suitable and satisfactory playback.

Figure 9:
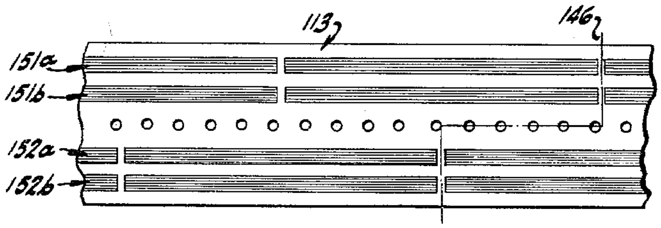
FIG. 9 is a partial enlarged view of magnetic tape having segmented recordings thereon as produced by the drum of FIG. 8.
Figure 8:
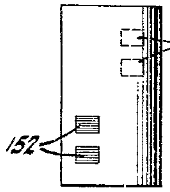
FIG. 8 is an enlarged elevational view of the recording or playback drum of FIGS. 5 and 6, with alternate head arrangement.

Editing and splicing of recorded tape is facilitated herein by the longitudinal tracks employed, inasmuch as only longitudinal portions of the tape need be cut out and possibly replaced. In this respect, the separation *e* of successive segments of each track is highly advantageous, for the tape cut is made through these unrecorded portions. Referring to FIG. 3, there is shown a line 46 across the tape as an indication of a splice or cut line. Cuts are made between successive full patterns and not through a single pattern, however, the perforation sets provide a ready guide for this operation as they identify such full patterns. In order to facilitate editing of tape in the embodiment hereof for stereophonic recording, the heads may be alternatively positioned upon the drum, as shown in FIG. 8. With the heads in pairs 151 and 152 as therein indicated, there will be produced a tape recording, as indicated in FIG. 9, wherein tracks 151*a* and 152*a* comprise one channel and 151*b* and 152*b* comprise the other channel of stereophonic recording or playback. In this case only one jog is included in any cut line 146 between successive patterns.

The invention heerinabove disclosed with respect to particular preferred embodiments thereof, will be seen to provide a substantial advancement in the art of tape recorders. There is herein achieved a high density recording without the necessity of lateral head motions which, in the past, have seriously hampered editing of recordings. Furthermore, prior-art problems of complexity and difficulties of control are almost entirely overcome with the device of this invention. It is further to be noted that only minimum amounts of tape are required for very substantial recording times, inasmuch as a low tape speed is maintained and this furthermore provides for a lessening of tape wear and a reduction in power requirements. All of the foregoing serves to combine into a truly practical and advantageous device which, although not limited to miniaturization, is admirably suited thereto. Of particular note is the provision herein for overcoming unavoidable circumstances encountered in the field of tape recording. In particular, there are considered the problems of mechanical tolerances, and unavoidable variations in mechanical means associated with such recording, whereby these variations in parameters are prevented from deleteriously affecting the fidelity of the reproduction. The invention does not rely upon precise manufacture, but instead, is based upon novel concepts to achieve the desired results despite variations in manufacture. Of significant importance is the provision herein of the physical gap between successive segments of each recorded track, and furthermore, in the provision of automatic threading arrangements whereby the magnetic tape can only be placed within a playback mechanism in the proper position for intelligent reproduction of the recording thereon. Further advantage is gained by the intentional provision of the minute time lag between the termination of one recorded track segment and the commencement of the next segment in an adjacent track. By the limitation of this time differential to the order of the duration of hearing persistence, the present invention provides for eliminating possible unpleasant phase differences which could otherwise occur in the translation of recording heads from one track segment to another. A diminution of the sound level at the human ear occurs during this minute time gap, so that phase differences occurring in the seemingly continuous sound reproduction do not provide a jarring note to the listener. It will be seen that the invention herein described accomplishes the objects set forth above, and does thereby provide an improved tape recorder.

What is claimed is:

1. An improved tape recorder comprising a rotatable recording drum having a plurality of heads spaced circumferentially thereabout and offset from each other longitudinally of said drum, tape drive means for engaging recording tape and drawing same across said head at a substantially constant velocity, and means rotating said recording drum oppositely to the direction of tape passage thereover at a velocity slightly less than the tape velocity times one less than the number of heads upon said drum whereby said heads record a plurality of segmented tracks upon said tape with minute separations between the successive segments of each track.

2. An improved tape recorder as set forth in claim 1, further defined by said tape drive means comprising a capstan positively engaging said tape for positive displacement of same with capstan rotation, and means rotating said drum comprising a precision gear train interconnecting said capstan and drum for affixing the relative rotational velocities of same.

3. An improved tape recorder as set forth in claim 1, further defined by said tape drive means comprising a sprocket wheel having sprockets unequally spaced circumferentially thereabout in a repeating pattern, and said tape having perforations unequally spaced longitudinally thereof in the same repeating pattern, whereby the tape can only be rethreaded upon the sprocket wheel in position for correct alinement with heads upon said drum.

4. An improved tape recorder comprising a rotatable drum, a plurality of *n* number of recording heads spaced equally about the circumference of said drum and spaced longitudinally thereon over a distance less than the width of tape to be recorded upon, drive means transporting tape across said drum over a limited circumferential extent thereof, means rotating said drum in a direction opposite to the direction of tape motion thereover whereby the recording speed is the sum of tape velocity and peripheral drum velocity, and means synchronizing the tape drive means and drum rotating means to establish a ratio of tape velocity to peripheral head velocity equal to the quantity $$\frac{1+\frac{e}{l}}{n-1-\frac{e}{l}}$$

wherein $l$ is the length of each segment recorded on the tape by each head and $e$ is the length of each unrecorded portion between successive recorded segments by the same head.

5. Tape recording apparatus as set forth in claim 4, further defined by means pressing tape against said drum about a circumferential extent of the latter an increment less than the drum circumference divided by the number of heads on the drum with said increment divided by the head speed being equal to a time period in the range of 0.01 to 0.07 second.

6. Tape recording apparatus comprising a rotatable drum having a plurality of $n$ number of recording head positions spaced apart equally about the drum circumference, at least one recording head disposed at each of said head positions and offset longitudinally of the drum with respect to each other with a total separation less than the width of tape to be recorded, tape transport means drawing tape across said drum in a direction normal to the drum axis, means pressing said tape against said drum over a limited circumference thereof equal to the circumference divided by $n$, and means synchronously rotating the drum and transport means in oppoiste directions to provide a recording speed equal to the sum of tape speed and drum speed with the ratio of said latter two speeds being sufficient to record a track segment of length $l$ during an incremental tape travel $d$ which occurs during $1/n$ complete drum rotation, wherein $nd=l+e$ and $e$ is a slight separation between successive recorded segments by each individual head.

7. Tape recording apparatus as set forth in claim 6 further defined by said tape transport means comprising a sprocket wheel having sprockets spaced thereabout in an uneven patterned spacing for engaging similarly spaced holes in recording tape with a pattern length equal to $nd$ whereby tape only engages the sprocket in particular relationships for automatic alinement with playback heads after recording.

8. Tape recording apparatus as set forth in claim 6, further defined by means pressing said tape against said drum for a distance less than the drum circumference divided by $n$, by an amount equal to the head speed times a time period of the order of the persistence of hearing of the human ear to insure against interference between playback of successively recorded segments.

9. Tape recording apparatus comprising a rotatable drum having a plurality of recording head positions spaced equally apart about the drum circumference, at least one recording head disposed at each of said head positions and offset longitudinally of the drum with respect to each other, tape transport means drawing recording tape across said drum normal to the axis thereof, means rotating said drum in a direction opposite to the direction of tape travel, and means pressing said tape against said drum over a circumferential extent of the latter equal to the drum circumference divided by the number of head positions less the amount equal to the peripheral drum speed times a time increment of the order of persistence of hearing of the human ear for producing multiple, longitudinally-segmented recording tracks having a limited time differential between consecutive track segments.

10. Tape recording apparatus comprising a rotatable recording drum having a plurality of recording heads circumferentially spaced thereabout and respectively offset from each other in the longitudinal direction of said drum, tape transport means drawing recording tape across said drum normal to the axis thereof, means rotating said drum to record multiple longitudinally-segmented laterally spaced recording tracks on said tape with successive segments of laterally adjacent tracks being consecutive in time, and means for establishing a time increment of the order of the persistence of hearing of the human ear between timewise consecutive ones of said segments.

11. An improved tape recorder comprising a rotatable recording drum having a plurality of heads spaced circumferentially thereabout and offset from each other longitudinally of said drum, tape drive means for engaging recording tape and drawing same across said head at a substantially constant velocity, said drive means including a sprocket wheel having sprockets spaced circumferentially thereabout in a repeating pattern, said tape having perforations spaced longitudinally thereof in the same repeating pattern as said sprockets such that the tape can only be re-threaded upon the sprocket wheel in position for correct alignment with said heads upon said drum, and means rotating said drum oppositely to the direction of tape passage thereover and at a velocity slightly less than the tape velocity times one less than the number of heads on the drum.

References Cited by the Examiner

UNITED STATES PATENTS

| | | | |
|---|---|---|---|
| 2,539,837 | 1/51 | Howell | 179—100.2 |
| 2,903,521 | 9/59 | Ellison | 179—100.2 |
| 2,977,423 | 3/61 | Springer | 179—100.2 |
| 3,047,673 | 7/62 | Springer | 179—100.2 |

FOREIGN PATENTS

| | | |
|---|---|---|
| 159,639 | 7/57 | Sweden. |

OTHER REFERENCES

German application No. T8962 (k 1 429), November 1956.

IRVING L. SRAGOW, *Primary Examiner.*

BERNARD KONICK, STEPHEN W. CAPELLI, *Examiners.*